(12) United States Patent
Byerly et al.

(10) Patent No.: US 6,905,416 B2
(45) Date of Patent: Jun. 14, 2005

(54) FLEXIBLE COUPLING

(75) Inventors: Duane V Byerly, Waukesha, WI (US); Stewart A Olson, Lincoln, NE (US)

(73) Assignee: Rexnord Industries, Inc., Milwaukee, WI (US)

( * ) Notice: Subject to any disclaimer, the term of this patent is extended or adjusted under 35 U.S.C. 154(b) by 11 days.

(21) Appl. No.: 10/033,794

(22) Filed: Jan. 3, 2002

(65) Prior Publication Data

US 2003/0125114 A1 Jul. 3, 2003

(51) Int. Cl.[7] .............................................. F16D 3/60
(52) U.S. Cl. ........................................ 464/69; 464/94
(58) Field of Search ...................... 464/69, 903, 92–94; 264/274

(56) References Cited

U.S. PATENT DOCUMENTS

| 1,359,157 | A |   | 11/1920 | Dexter |           |
|-----------|---|---|---------|--------|-----------|
| 4,790,794 | A |   | 12/1988 | Takeda et al. |    |
| 5,020,207 | A | * | 6/1991  | Minoda et al. | 264/274 X |
| 5,033,988 | A | * | 7/1991  | McGuire et al. | 464/69 |
| 5,540,621 | A |   | 7/1996  | Keester et al. |   |
| 5,724,715 | A | * | 3/1998  | Byerly et al. | 464/903 X |
| 5,986,364 | A | * | 11/1999 | Bingle et al. |    |
| 6,176,784 | B1 | * | 1/2001 | Albers | 464/69 |
| 6,315,670 | B1 | * | 11/2001 | Andra et al. | 464/69 |
| 2003/0022720 | A1 | * | 1/2003 | Takei | 464/69 |

FOREIGN PATENT DOCUMENTS

| DE | 197 42 359 A1 |   | 4/1999  |        |
|----|---------------|---|---------|--------|
| EP | 1 072 808 A2  |   | 1/2001  |        |
| FR | 1 146604 A    |   | 11/1957 |        |
| FR | 2 313 595     | * | 12/1976 | 464/69 |
| IT | 406830        | * | 11/1946 | 464/93 |
| JP | A 11-226994   |   | 8/1999  |        |
| WO | 99/15803      |   | 4/1999  |        |

* cited by examiner

*Primary Examiner*—Greg Binda
(74) *Attorney, Agent, or Firm*—Quarles & Brady LLP

(57) ABSTRACT

A flexible coupling is provided to connect a flange on a drive shaft to a flange on a driven shaft. Circumferentially spaced fastening means provide bores through the coupling through which bolts can be passed to connect it alternately to the one and then the other flange. Adjacent fastening means are interconnected by link and washers are positioned at opposite ends of the stack of links at each fastening means. In accordance with the invention the washers are formed with peripheral grooves which will be entered by the plastics material forming the body of the coupling, thus locking the washers against being expelled when bolts are subsequently passed through the bores.

8 Claims, 2 Drawing Sheets

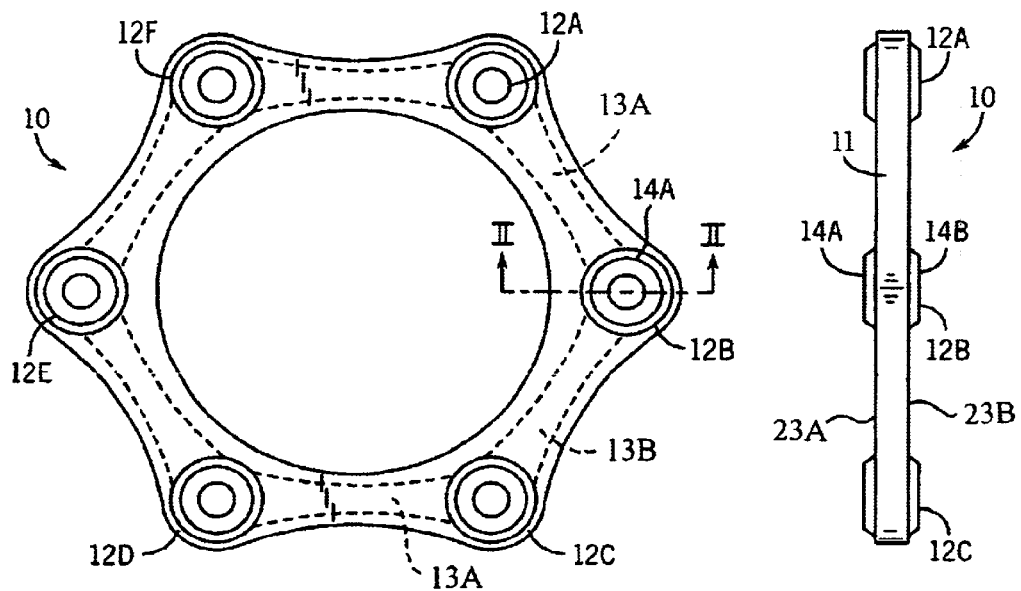
FIG. 1
FIG. 3
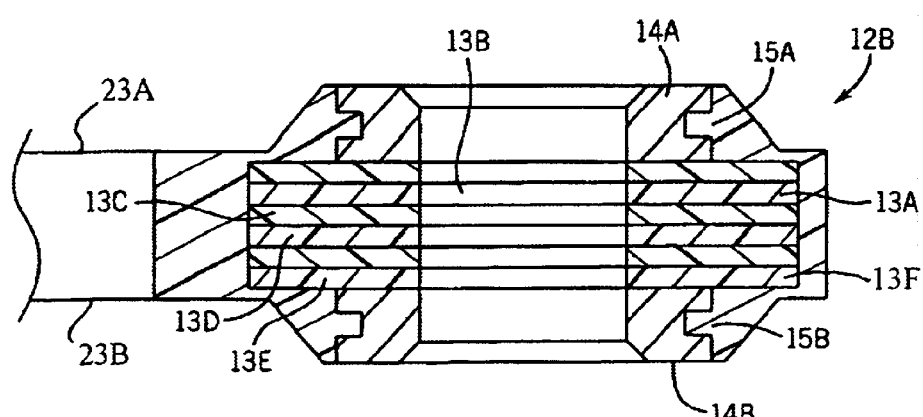
FIG. 2

FLEXIBLE COUPLING

This invention relates to an improved flexible coupling for connecting a drive to a driven shaft and to a method of manufacturing the same.

BACKGROUND OF THE INVENTION

Flexible couplings are known which comprise an annular body, typically of a plastics material, incorporating circumferentially spaced, parallel bores through which bolts can be passed to bolt the coupling to an annular flange on the drive shaft and to an annular flange on the driven shaft. The body has an even number of fastening means providing bores and alternate bolts connect the body to the one and then the other flange. Adjacent bores are linked so that as each bolt connected to the flange on the drive shaft moves it drags with it the bolt upstream of it connected to the flange on the driven shaft. The body is substantially inelastic but has a degree of flexibility, and this permits minor misalignment between the shafts without destruction of the coupling. The fastening means providing the bores may be bushes connected by strands passed around and between them, but conveniently may be constituted by, or may comprise, apertures at opposite ends of metal links. An even number of links is "stacked" with the apertures at one of their respective ends in alignment and the apertures at the other of their respective ends located alternately at the adjacent fastening means on opposite sides of the first-mentioned fastening means. Washers are located on opposite sides of each "stack" of links to provide end orifices for the bores.

The problem arises that when a bolt is subsequently pushed through a bore of a previously manufactured coupling it is liable to push the downstream washer out of the body of the coupling, the bond between the washer and the plastics material of the body being insufficient to prevent this.

An object of the present invention is to overcome this problem by keying the washers to the body so that only a force sufficient to shear the material of the body would be great enough to allow a washer to be expelled. In practice forces of this magnitude will not be encountered.

SUMMARY OF THE INVENTION

In accordance with one aspect of the present invention there is provided a flexible coupling for connecting a drive to a driven shaft, the coupling comprising an annular body of a mouldable material in which fastener means are incorporated whereby the coupling may be fastened to the shafts, the fastener means comprising an even number of parallel bores circumferentially distributed about said body, each bore opening to opposite sides of the body, a plurality of link means passing around each bore and extending at least one to the adjacent bore in one direction from said first-mentioned bore and at least one to the adjacent bore in the other direction from said first-mentioned bore, and washer means on opposite sides of said link means defining end orifices of each bore, each washer means having a peripheral formation such that when the body is moulded to incorporate the fastener means and link means each washer means will be locked by the moulded material against displacement out of said body.

In accordance with another aspect of the present invention there is provided the assembly of a flexible coupling according to the immediately preceding paragraph, a drive shaft having an annular flange formed with a number of circumferentially spaced holes at least half the number of the fastener means, a driven shaft having an annular flange formed with a number of circumferentially spaced holes at least half the number of the fastener means and a plurality of bolts passing through respective said fastener means, half of the bolts fastening the coupling to the flange of the drive shaft and the other half of the bolts fastening the flange on the driven shaft to the coupling.

Said peripheral formation is preferably a peripheral groove in each said washer means.

The mouldable material is preferably a thermosetting plastics material, such as a urethane polymer.

The washer means are preferably of metal and the link means may be of a composite material such as thermosetting fibreglass expoxy, each having openings at its opposite ends which will constitute part of two adjacent said bores, an even number of links in a stacked relationship between a pair of washer means constituting each said bore with alternate links extending to the bores on opposite sides of said first-mentioned bore.

The body may have parallel faces from which the washer means project, the moldable material being shaped to surround each washer.

In accordance with another aspect of the present invention there is provided a method of manufacturing the flexible coupling of the present invention, the method comprising locating in a mould an annular array of circumferentially spaced fastening means comprising link means which extend between adjacent fastening means and washer means on opposite sides of the link means, introducing into the mould a thermosetting plastics material in a liquid state so that it incorporates the fastening means and link means and penetrates said formations of the washer means and curing the plastics material.

The mould may be spun while a urethane polymer is introduced into it in a liquid state.

BRIEF DESCRIPTION OF THE DRAWINGS

A preferred embodiment of the present invention will now be described by way of non-limitative example with reference to the accopanying drawings, in which:

FIG. 1 is a front elevation of a flexible coupling in accordance with the present invention;

FIG. 2 is an enlarged sectional elevation of one of the fastening means of the coupling, taken on the line II—II of FIG. 1, and FIG. 3 is a side elevation of the coupling;

DETAILED DESCRIPTION OF THE PREFERRED EMBODIMENT

Figure 4:
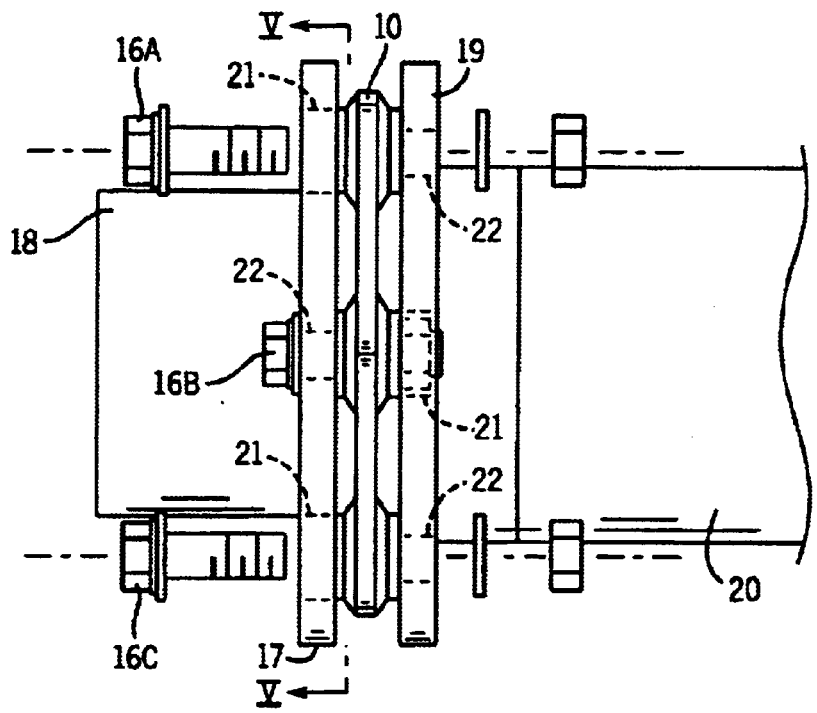
FIG. 4 is a partly exploded side view of the coupling interposed between flanges of a drive and of a driven shaft.

The flexible coupling 10 illustrated comprises an annular body 11 of a thermosetting plastics material, such as a urethane polymer, in which are embedded in an equally circumferentially spaced array six similar fastening means 12A–12F. The fastening means 12A–12F provide parallel bores through the body 11 through which bolts 16A–16F may be passed to secure the coupling to an annular flange 17 at one end of a drive shaft 18 and to an annular flange 19 at one end of a driven shaft 20, alternate bolts securing the coupling first to one and then the other flange 17,19 when the coupling is interposed between and substantially coaxially aligned with the flanges.

Figure 5:
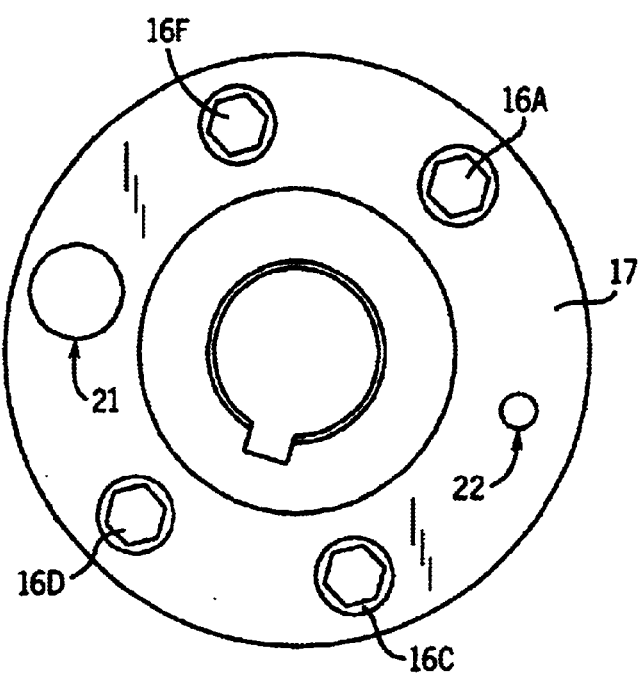
FIG. 5 is a front elevation of one of the flanges taken on the line V—V of FIG. 4.

Three of the bolts 16A–16C are visible in FIG. 4. At the location of the bolts 16A and 16C the flange 17 is formed with relatively large-diameter holes giving clearance for the shanks of the bolts 16A and 16C but at the location of the bolt 16B it is formed with a relatively narrower-diameter hole substantially fitting the shank of the bolt 16B. An example of a larger hole is indicated at 21 in FIG. 5 and a smaller one at 22. The larger and smaller holes alternate around the flange 17. On the confronting flange 19 the arrangement of holes such as 21,22 is the opposite. Thus in the assembled condition of the coupling it is substantially incapable of angular movement relative to the flange 17 about half of the bolts 16A–16F but angular movement of the other half of the bolts is possible within the limits of the larger holes such as 21 in the flange 17. In the case of the flange 19 the arrangement is opposite. The bolts which are immovable relative to the flange 17 can move angularly within the larger holes such as 21 of the flange 19 and the bolts which can move angularly relative to the flange 19 are immovable relative to the flange 17.

Links 13A–13F have apertures at their opposite ends. These links are of a composite materials, such as thermo-setting fiberglass epoxy. They are arranged in a stack with the apertures at one of their respective ends in alignment to form the central part of the bore of a fastening means as illustrated in FIG. 2 in the case of the fastening means 12B. A first link 13A of the fastening means 12B extends to the fastening means 12A adjacent to the fastening means 12B counter-clockwise as viewed in FIG. 1, a second link 13B extends to the fastening means 12C adjacent to the fastening means 12B in the clockwise direction as viewed in FIG. 1 and so on in alternate sequence. The opposite ends of the links 13A–13F are interleaved with other similar links extending between the fastening means 12A and 12F and between fastening means 12C and 12D to form the central parts of the bores of the fastening means 12A and 12C.

By this arrangement, in whichever sense the coupling 10 is rotated by the drive shaft each fastening means bolted to the drive shaft flange will drag after it the adjacent fastening means bolted to the driven shaft on its upstream side. Meanwhile a minor misalignment between the drive and driven shafts can be tolerated by the flexibility of the coupling.

Each fastening means 12A–12F is completed by a pair of washers, such as indicated at 14A, 14B in FIG. 2, the washers being located at opposite ends of the associated stack of links, such as 13A–13F, protruding from parallel faces 23A, 23B of the body 11.

In accordance with the present invention each washer such as 14A and 14B is formed with a peripheral groove such as 15A,15B (FIG. 2). In the manufacture of the flexible coupling the links and the washers are positioned in a dry mould which is then spun as a thermosetting plastics material such as a urethane polymer is introduced. The plastics material enters the grooves such as 15A and 15B and, after the plastics material has hardened, locks the washers such as 14A,14B into the body 11 of plastics material. This prevents the downstream washer such as 14A or 14B from being expelled from the body 11 when a bolt is subsequently passed through the bore of a fastening means 12A–12F to fasten the coupling either to the flange of the drive shaft or to the flange of the driven shaft.

It will be understood that each washer such as 14A,14B may have a formation instead of or additional to the groove such as 15A,15B which will serve to lock it within the moulded body 11.

In the preferred embodiment illustrated, the bores of the fastening means 12A–12F are formed exclusively by apertures of links, such as 13A–13F, and a pair of washers, such as 14A, 14B, all coaxially aligned. However, a bush may extend through the whole or a part of the bore, being surrounded by the links and washers.

Links 13A–13F with apertures at their opposite ends are merely exemplary of the ways in which adjacent fastening means 12A–12F may be interconnected. Instead of, or in addition to, the link strands, for example, resin-impregnated strands may be between bushes constituting all or part of the bore of each fastening means.

What is claimed is:

1. A flexible coupling for connecting a drive to a driven shaft, the coupling comprising:
   an annular body of a moldable material;
   a number of parallel bores circumferentially distributed about said body, each bore opening to opposite sides of the body;
   a plurality of link means passing around each bore, at least one of said link means of said plurality of link means extending from at least one of said bores to at least one adjacent bore in one direction from said at least one of said bores, and at least one other of said link means of said plurality of link means extending from said at least one of said bores to at least one adjacent bore in another direction from said at least one of said bores, at least a portion of each of said bores being formed exclusively by apertures of at least one of said link means; and
   washer means on opposite sides of said link means defining end orifices of each bore, each washer means having a peripheral formation, said peripheral formation engaging said moldable material such that when the body is molded to incorporate the bores and link means, each washer means is locked by the moldable material against displacement out of said body.

2. A flexible coupling as claimed in claim 1, in which said coupling couples a drive shaft having an annular flange formed with a number of circumferentially spaced holes to a driven shaft having an annular flange formed with a number of circumferentially spaced holes with a plurality of bolts passing through respective said bores, wherein at least one of said bolts fastens the coupling to the flange of the drive shaft and at least one other of said bolts fastens the flange on the driven shaft to the coupling.

3. A flexible coupling as claimed in claim 1, wherein said peripheral formation is a peripheral groove in each said washer means.

4. A flexible coupling as claimed in claim 1, wherein the moldable material is a thermosetting plastics material.

5. A flexible coupling as claimed in claim 4, wherein the plastics material is a urethane polymer.

6. A flexible coupling as claimed in claim 1, wherein the washer means are of metal.

7. A flexible coupling as claimed in claim 1, wherein the link means are of composite material.

8. A flexible coupling as claimed in claim 1, wherein the body has parallel faces extending between adjacent bores from which the washer means project, the moldable material being shaped to surround each washer means projecting from one of said body faces.

* * * * *

UNITED STATES PATENT AND TRADEMARK OFFICE
CERTIFICATE OF CORRECTION

PATENT NO. : 6,905,416 B2
DATED : June 14, 2005
INVENTOR(S) : Byerly et al.

It is certified that error appears in the above-identified patent and that said Letters Patent is hereby corrected as shown below:

Column 2,
Line 42, "accopanying" is changed to -- accompanying --.

Column 4,
Line 14, insert -- wound -- between "may be" and "between".

Signed and Sealed this

Twenty-ninth Day of November, 2005

JON W. DUDAS
*Director of the United States Patent and Trademark Office*